US009101891B2

(12) United States Patent
Odagi

(10) Patent No.: US 9,101,891 B2
(45) Date of Patent: Aug. 11, 2015

(54) CIRCULATING-TYPE DISPERSING SYSTEM AND A METHOD THEREFOR

(75) Inventor: Katsuaki Odagi, Toyokawa (JP)

(73) Assignee: SINTOKOGIO, LTD., Nagoya-Shi (JP)

( * ) Notice: Subject to any disclaimer, the term of this patent is extended or adjusted under 35 U.S.C. 154(b) by 389 days.

(21) Appl. No.: 13/638,720

(22) PCT Filed: Dec. 22, 2010

(86) PCT No.: PCT/JP2010/007437

§ 371 (c)(1),
(2), (4) Date: Oct. 1, 2012

(87) PCT Pub. No.: WO2011/125144

PCT Pub. Date: Oct. 13, 2011

(65) Prior Publication Data

US 2013/0019972 A1 Jan. 24, 2013

(30) Foreign Application Priority Data

Apr. 8, 2010 (JP) ................................ 2010-089692

(51) Int. Cl.
*B01D 3/42* (2006.01)
*F16K 21/18* (2006.01)
(Continued)

(52) U.S. Cl.
CPC ............ *B01F 3/0807* (2013.01); *B01F 3/0857* (2013.01); *B01F 3/1221* (2013.01);
(Continued)

(58) Field of Classification Search
CPC .... B01F 3/0807; B01F 3/1221; B01F 3/0857; B01F 15/0235; B01F 15/00155; B01F 15/00123; B01F 15/0035; B01F 5/104; B01F 5/106; B01F 7/007; B01F 7/00866; B01F 7/16; B01F 13/1027; B01F 2215/0431; B01F 2215/0422; B01F 2003/0035
USPC ......... 137/386, 563, 391, 605, 395, 572, 392; 141/95, 192; 366/136, 152.6, 153.1, 366/155.1, 182.4, 306, 303
See application file for complete search history.

(56) References Cited

U.S. PATENT DOCUMENTS

| | | | | |
|---|---|---|---|---|
| 4,571,092 | A * | 2/1986 | Switall | 366/348 |
| 4,955,723 | A * | 9/1990 | Schneider | 366/136 |

(Continued)

FOREIGN PATENT DOCUMENTS

| | | |
|---|---|---|
| JP | 2000-351916 | 12/2000 |
| JP | 2004-267991 | 9/2004 |
| JP | 2009-051831 | 3/2009 |

OTHER PUBLICATIONS

JP2000-351916, 12-19-200, Dainippon Ink & Chem Co, English Machine Translation of the Description, Espacenet, http://translationportal.epo.org/emtp/translate/?ACTION=description-retrieval&COUNTRY=JP&ENGINE=google&FORMAT=docdb&KIND=A&LOCALE=en_EP&NUMBER=2000351916&OPS=jp.espacenet.com/ops&SRCLANG=ja&TRGLANG=en.*
(Continued)

*Primary Examiner* — Craig Schneider
*Assistant Examiner* — Josephine Trinidad-Borges
(74) *Attorney, Agent, or Firm* — Finnegan, Henderson, Farabow, Garrett & Dunner, L.L.P.

(57) ABSTRACT

The present invention is to provide a circulating-type dispersing system (1) and method for uniformly, effectively, and repeatedly dispersing a large amount of a mixture, and to thereby obtain a processed mixture in a short time. The circulating-type dispersing system (1) for circulating and dispersing a slurry or liquid mixture comprises a device (3) for continuously dispersing the mixture, a first tank (4) connected to an outlet of the device (3) for continuously dispersing, a second tank (5) connected to an inlet of the device (3) for continuously dispersing, piping (6) that connects the device (3) for continuously dispersing, the first tank (4) and the second tank (5) in series and formed as a circle, and an adjusting valve (7) provided on the piping (6) between the first tank (4) and the second tank (5) for adjusting the levels of the mixture in the first and second tanks.

6 Claims, 7 Drawing Sheets

(51) Int. Cl.

| | |
|---|---|
| ***B01F 3/08*** | (2006.01) |
| ***B01F 3/12*** | (2006.01) |
| ***B01F 5/10*** | (2006.01) |
| ***B01F 7/00*** | (2006.01) |
| ***B01F 13/10*** | (2006.01) |
| ***B01F 15/00*** | (2006.01) |
| *E03B 7/07* | (2006.01) |
| *E03B 11/00* | (2006.01) |
| *F17D 1/00* | (2006.01) |
| *B01F 15/02* | (2006.01) |
| *G05D 11/02* | (2006.01) |
| *B01F 7/16* | (2006.01) |
| *B01F 3/00* | (2006.01) |

(52) U.S. Cl.

CPC ................ *B01F 5/104* (2013.01); *B01F 5/106* (2013.01); *B01F 7/007* (2013.01); *B01F 7/00866* (2013.01); *B01F 13/1027* (2013.01); *B01F 15/0035* (2013.01); *B01F 15/00123* (2013.01); *B01F 15/00155* (2013.01); *B01F 15/0235* (2013.01); *B01F 7/16* (2013.01); *B01F 2003/0035* (2013.01); *B01F 2215/0422* (2013.01); *B01F 2215/0431* (2013.01)

(56) References Cited

U.S. PATENT DOCUMENTS

| | | | | | |
|---|---|---|---|---|---|
| 5,951,161 | A * | 9/1999 | Blagg | 366/152.6 |
| 5,954,078 | A * | 9/1999 | Chiang et al. | 137/2 |
| 7,083,322 | B2 * | 8/2006 | Moore et al. | 366/118 |
| 2005/0146982 | A1 | 7/2005 | Carlson et al. | |
| 2005/0232071 | A1 * | 10/2005 | Matsumoto et al. | 366/136 |
| 2007/0047382 | A1 * | 3/2007 | McCurdy et al. | 366/153.1 |

OTHER PUBLICATIONS

English-language International Search Report issued by the European Patent Office in International Application No. PCT/JP2010/007437, mailed May 20, 2011 (2 pages).

* cited by examiner

CIRCULATING-TYPE DISPERSING SYSTEM AND A METHOD THEREFOR

TECHNICAL FIELD

The present invention relates to a system and a method for dispersing substances in a mixture, such as a slurry mixture and a liquid mixture, by circulating the mixture.

BACKGROUND ART

A device for a batch-type dispersion or a device for continuously dispersing has been used for dispersing solids in a liquid, such as a slurry or a mixture of a liquid and solids. However, by device for a batch-type dispersion a raw material may not evenly pass through a region for generating a shearing force for dispersing. Thus a part of the raw material may accumulate at a particular location in a vessel. That results in a longer time to obtain a uniformly dispersed material as a whole. By a device for continuously dispersing an insufficiently dispersed material may be obtained, since the raw material just one time passes through the region for generating shearing forces for dispersing.

To solve these problems, a system is known that comprises a tank for supplying a mixture to the device for continuously dispersing, a tank for receiving the mixture that has been dispersed by the device for continuously dispersing, and multiple paths for alternately changing the tank for supplying and the tank for receiving (see Japanese Patent Laid-open Publication No. 2009-51831). However, changing the paths for the tanks is troublesome. Thus a circulating-type dispersing system that includes a device for continuously dispersing was proposed. However, if the inlet and outlet of the device for continuously dispersing were just connected by piping, just a very small amount of the mixture could be processed. Therefore, a storage tank may be provided along the piping to increase the amount of the mixture to be processed (see Japanese Patent Laid-open Publication No. 2004-267991).

In that system some of the mixture may pass through the storage tank in a short time and some may stay there for a long time, before flowing out of the tank. Thus not all of the mixture may be processed by the device for continuously dispersing to the same degree. Thus a long time is required to obtain a uniformly processed mixture. That has been a problem.

The object of the present invention is to provide a system and a method for dispersing a large amount of a raw material uniformly and effectively by circulating it. By that system or method, a processed mixture can be obtained in a short time.

DISCLOSURE OF INVENTION

The circulating-type dispersing system of the present invention is a system for dispersing a mixture, such as a slurry or a liquid, by a circulation that comprises a device for dispersing the mixture, a first tank connected to an outlet of the device, a second tank connected to an inlet of the device, piping connecting the device, the first tank, and the second tank, being in series and formed as a circle, and an adjusting valve provided on the piping between the first tank and the second tank for adjusting the levels of the mixture in the first and second tanks. When the adjusting valve is closed, the mixture that has been processed by the device for continuously dispersing accumulates in the first tank and the mixture in the second tank is supplied to the device for continuously dispersing. When the level of the mixture in the second tank reaches the lower limit, the valve is opened to supply the mixture in the first tank to the second tank. The dispersing method by the circulation of the present invention is a method for dispersing a mixture, such as a slurry or a liquid, by a circulation that comprises the steps of dispersing the mixture by a device for continuously dispersing, circulating the mixture through piping that connects in series the device for continuously dispersing, a first tank provided at the outlet side of the device for continuously dispersing, and a second tank provided at the inlet side of the device for continuously dispersing, accumulating the mixture that has been processed by the device for continuously dispersing in the first tank and supplying the mixture in the second tank to the device for continuously dispersing by closing an adjusting valve provided between the first tank and the second tank, and supplying the mixture in the first tank to the second tank when the level of the mixture in the second tank reaches the lower limit.

By to the present invention a large amount of a raw material can be repeatedly and uniformly dispersed. It can be effectively dispersed. The time needed to obtain a homogeneously processed mixture can be shortened.

The basic Japanese patent application, No. 2010-089692, filed Apr. 8, 2010, is hereby incorporated by reference in its entirety in the present application.

The present invention will become more fully understood from the detailed description given below. However, the detailed description and the specific embodiment are only illustrations of desired embodiments of the present invention, and so are given only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present invention in the sense of the doctrine of equivalents.

The use of the articles "a," "an," and "the" and similar referents in the specification and claims are to be construed to cover both the singular and the plural, unless otherwise indicated herein or clearly contradicted by the context. The use of any and all examples, or exemplary language (e.g., "such as") provided herein, is intended merely to better illuminate the invention, and so does not limit the scope of the invention, unless otherwise claimed.

BRIEF DESCRIPTION OF DRAWINGS

FIG. 2(*a*) shows that the adjusting valve is opened when the second sensor detects that the level of the mixture in the second tank reaches the lower limit. FIG. 2(*b*) shows that the adjusting valve is closed when the first sensor detects that the level of the mixture in the first tank reaches the lower limit.

BEST MODE FOR CARRYING OUT THE INVENTION

Below, the circulating-type dispersing system 1 of the present invention will be described with reference to the drawings. The circulating-type dispersing system 1 to be described below is one that disperses a slurry mixture 2 (also called a "solid-liquid dispersion" or a "slurry"). However, the present invention is not limited to that dispersing system. It is equally effective in one that disperses a liquid mixture (also called a "liquid-liquid dispersion" or an "emulsification"). The term "disperse" means to disperse a mixture, i.e., mixing a mixture so that all substances are uniformly present.

Figure 1:
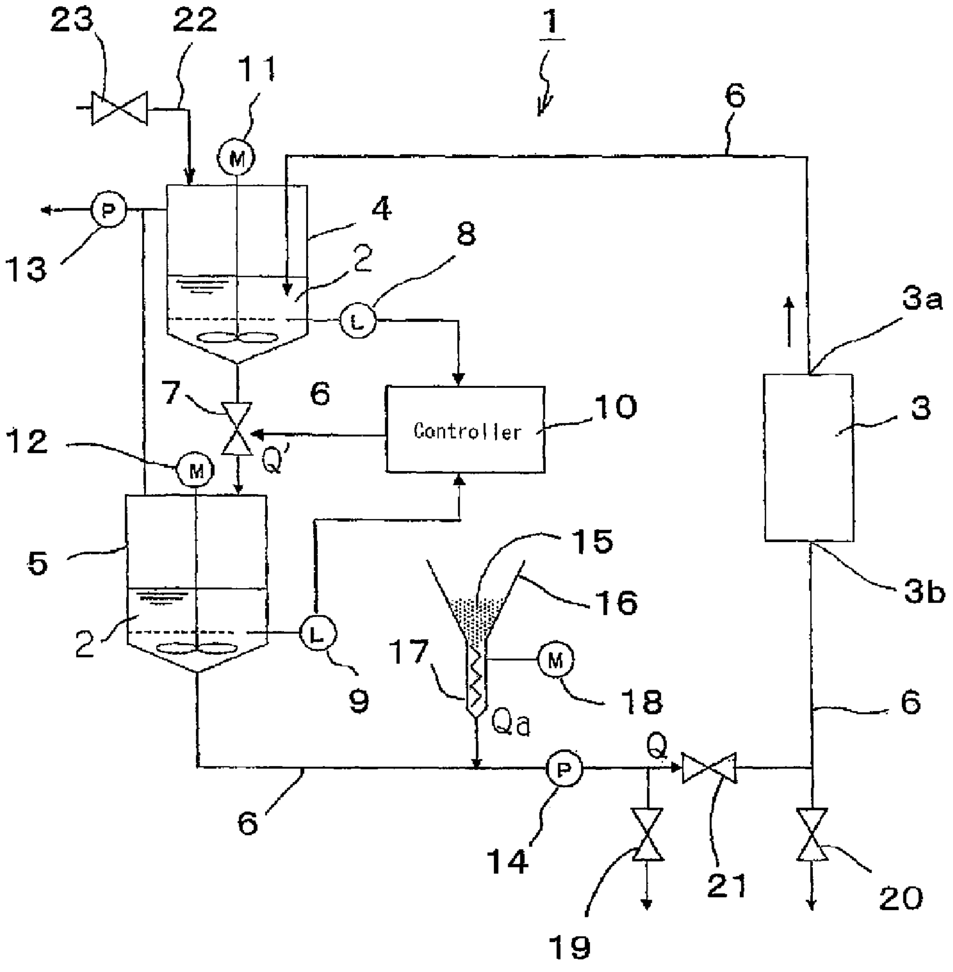
FIG. 1 is a schematic drawing that illustrates the circulating-type dispersing system of the present invention.

As shown in FIG. 1, the circulating-type dispersing system 1 comprises a device 3 for continuously dispersing for dispersing the mixture 2, a first tank 4 that is connected to an outlet 3*a* of the device 3 for continuously dispersing, a second tank 5 that is connected to an inlet 3*b* of the device 3 for continuously dispersing, piping 6 that connects in series and as in a circle the device 3 for continuously dispersing, the first tank 4, and the second tank 5, and an adjusting valve 7 that is disposed between the first tank 4 and the second tank 5 and that adjusts the levels of the mixture in the first tank 4 and the second tank 5. The first tank 4 is located at a higher elevation than that of the second tank 5. However, if a pump 29, which is later described, is provided, this relationship in their elevation can be changed. In this circulating-type dispersing system 1, by closing the adjusting valve 7, the mixture that has been processed by the device 3 for continuously dispersing accumulates in the first tank 4 and the mixture in the second tank 5 is supplied to the device 3 for continuously dispersing. When the level of the mixture in the second tank 5 reaches the lower limit, the adjusting valve 7 is opened to supply the mixture in the first tank 4 to the second tank 5.

Figure 2:
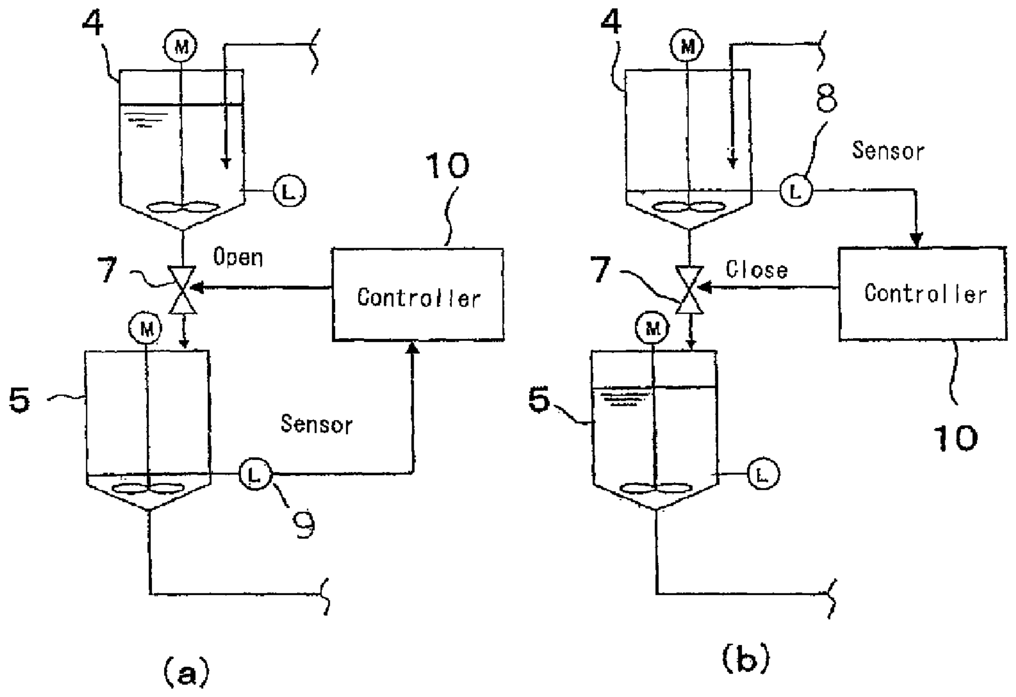
FIG. 2 illustrates one of the functions and the operation of the circulating-type dispersing system.
Figure 3:
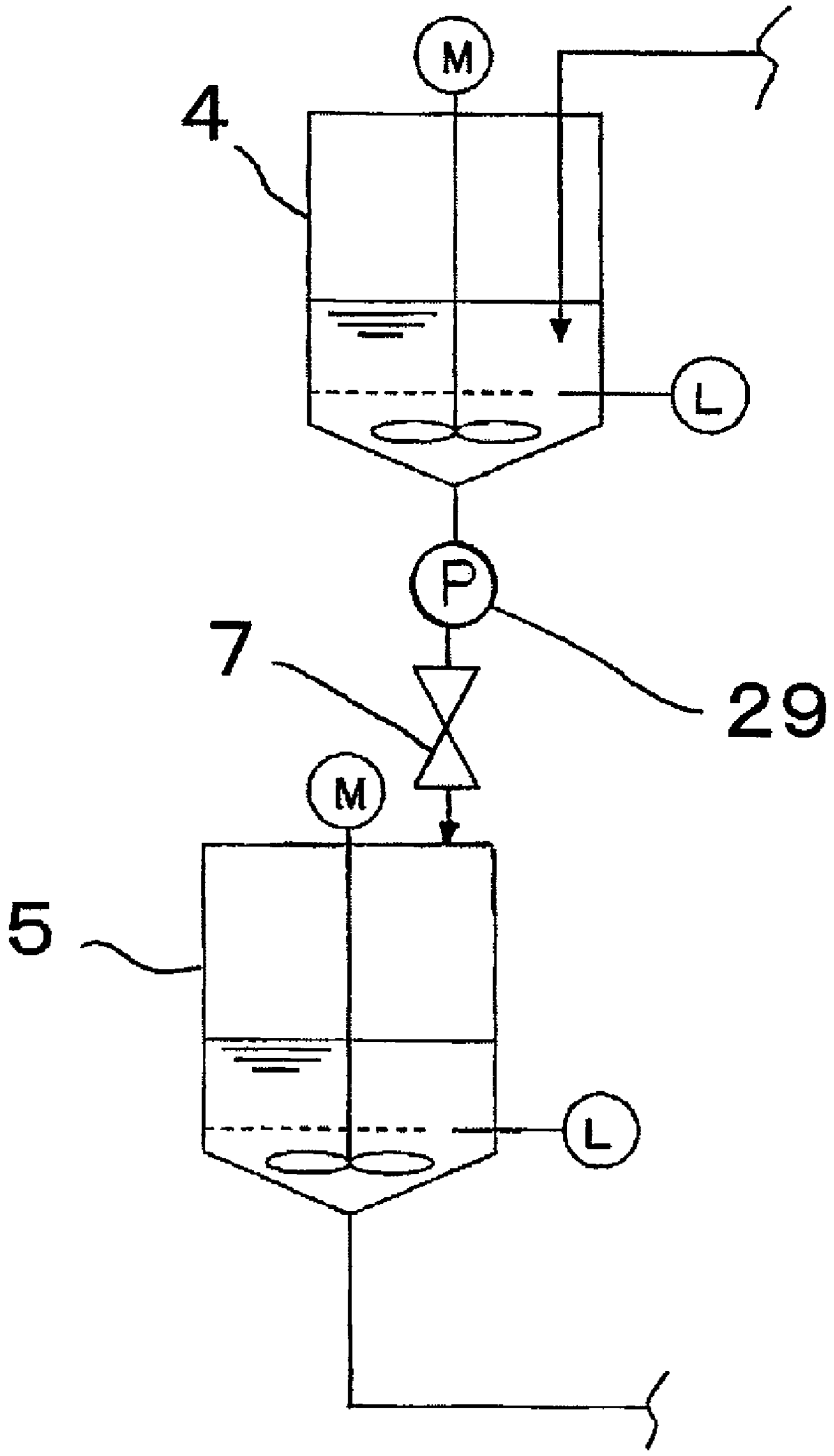
FIG. 3 shows a variation of the circulating-type dispersing system, where a pump is provided between the first tank and the second tank, to increase the flow of the mixture from the first tank to the second tank.

The circulating-type dispersing system 1 comprises a first sensor 8 that is disposed in the first tank 4 and a second sensor 9 that is disposed in the second tank 5. The first sensor 8 detects if the level of the mixture in the first tank 4 reaches the lower limit. The second sensor 9 detects if the level of the mixture in the second tank 5 reaches the lower limit. The circulating-type dispersing system 1 also comprises a controller 10 for controlling the adjusting valve 7 based on the detected levels of the first and second sensors 8, 9. As shown in FIG. 2(*a*), when the second sensor 9 detects the level being at the lower limit, the controller 10 causes the adjusting valve 7 to open. As shown in FIG. 2(*b*), when the first sensor 8 detects the level being at the lower limit, the controller 10 causes the adjusting valve 7 to close.

In the circulating-type dispersing system 1, the flow through the piping 6 between the outlet of the first tank 4 and the inlet of the second tank 5 is designed to be greater than that between the outlet of the second tank 5 and inlet 3*b* of the advice 3 for continuously dispersing. This design can be achieved, for example, by making the piping 6 between the outlet of the first tank 4 and the inlet of the second tank 5 larger. Alternatively, it may be achieved by providing a pump 29 on the piping 6 between the outlet of the first tank 4 and the inlet of the second tank 5.

The circulating-type dispersing system 1 further comprises agitators 11, 12 for agitating the mixtures in the first and second tanks 4, 5, respectively, and a pump (a vacuum pump) 13 for depressurizing the insides of the first and second tanks 4, 5. It comprises a pump 14 for supplying the mixture from the second tank 5 to the first tank 4 via the device 3 for continuously dispersing. It comprises a hopper 16 for storing additives 15 and a feeder 17 for feeding the additives from the hopper 16 to the raw material that circulates in the piping 6. The feeder 17 is equipped with a mechanism for pushing additives 18. The circulating-type dispersing system 1 is further equipped with valves 19, 20 for discharging the processed mixture after finishing the dispersing process and a valve 21 that is used when the mixture is discharged. In the circulating-type dispersing system 1, during the operation the discharging valves 19, 20 are closed and the valve 21 is opened. The circulating-type dispersing system 1 comprises piping 22 for supplying the raw material, for example, to the first tank 4, and a valve 23 for supplying the raw material. The material before the additives 15 are added to it is herein called a raw material. On the upstream side of the valve 23 a tank for supplying the raw material and so on are provided. They are not shown in the drawings. The location for supplying the raw material or the additives is not limited to these locations, as discussed later.

As discussed above, the circulating-type dispersing system 1 is a system that effectively performs repeated dispersions ("circulating and dispersing device"). The system 1 takes advantage of the circulation by installing the piping 6 between the outlet and the inlet for the raw material (the mixture) of the device 3 for continuously dispersing. It also utilizes a control for storing and discharging the raw material in two tanks (the first tank 4 and the second tank 5) that are provided on the piping 6. As shown in FIG. 1, the first tank 4 and the second tank 5 are connected in series via the adjusting valve 7. The first and second tanks 4, 5 store the mixture (that has originally been supplied through the piping 22 for supplying the raw material). At first the fluid that circulates through the first and second tanks 4, 5, the device 3 for continuously dispersing, and the piping 6 is the raw material. After each process is carried out by the device 3 for continuously dispersing, it becomes the mixture in which the additives 15 are dispersed. Finally it becomes the processed mixture. In the description herein both the first "raw material," and the "mixture" in the process, are generally called the "mixture." The mixture that flows out of the second tank 5 flows through the pump 14 and the valve 21 into the device 3 for continuously dispersing. On the path from the second tank 5 to the device 3 for continuously dispersing, the additives 15 (in the form of a liquid or particles) that are stored in the hopper 16 are added by the feeder 17 to the mixture (raw material) that circulates. The mixture that has been dispersed by the device 3 for continuously dispersing is stored in the first tank 4. The mixture in the first and second tanks 4, 5 is agitated by the agitators 11, 12, respectively, to prevent the segregation of the mixtures.

An exemplary device 3 for continuously dispersing of the device for continuously dispersing to be used for the circulating-type dispersing system 1 will be later described in detail with reference to FIGS. 4 to 7. However, the device for continuously dispersing is not limited to it. What is called a homogenizer, or a sand grinder, or a bead mill, or a colloid mill, or a biaxial kneader, etc., can be used and be selected depending on the material to be processed and the intended degree of dispersion. A screw feeder, a rotary feeder, a plunger feeder, etc. can be used for the feeder 17 for the additives 15.

A level sensor (the first sensor 8) is provided in the first tank 4. Another level sensor (the second sensor 9) is provided in the second tank 5. Both detect the lower limits of the mixtures stored in the respective tanks. The lower limits are the minimum levels where the mixture can be circulated without stopping the flow. They are set based on the flow (or the flow rate) of the mixture that is determined by the pump 14 or the device 3 for continuously dispersing. A vacuum pump (the pump 13) is connected to the first and second tanks 4, 5, to defoam the mixture under a negative pressure.

During the operation, the adjusting valve 7 is opened and closed to adjust the flow. Normally, the valve 21 is open and the valves 19, 20 are closed. After the process is completed, the valve 21 is closed and the valves 19, 20 are opened. Thus the processed mixture is discharged and collected through the valve 19. The mixture that remains in the device 3 for continuously dispersing and the piping 6 is discharged and collected though the opened valve 20. A valve for discharging and collecting the mixture may be provided at any position, e.g., any tank or any position in the piping.

Next, the method for the circulating-type dispersion (dispersing process) by using the circulating-type dispersing system 1, which is discussed above, will be discussed. At an initial state, the pump 14 and the agitators 11, 12 stop and all the valves (the adjusting valve 7 and the valves 19, 20, 21) are closed. At the first step, a medium (the liquid material) that has been weighed is supplied into the first tank 4 from the piping 22 for supplying the raw material. Then the agitator 11 is activated. The volume of the material to be supplied is assumed to be equal to the maximum volume of the first tank 4. However, the volume of the material to be supplied is not limited to that. At the second step, the adjusting valve 7 is opened to supply the mixture in the first tank 4 to the second tank 5 until the first sensor 8 detects that the level of the mixture in the first tank 4 has reached the minimum level. When all the mixture has been supplied, the start-up operation is completed. Then the agitator 12 is activated.

At the third step, the adjusting valve 7 is closed and the valve 21 is opened. The device 3 for continuously dispersing and the pump 14 are activated. Now the insides of the device 3 for continuously dispersing and the pump 14 are assumed to be filled with the liquid material. However, if the device 3 for continuously dispersing and the pump 14 are allowed to idle, they may not be filled. Thus the mixture that is stored in the second tank 5 flows through the pump 14, the valve 21, and the device 3 for continuously dispersing, and returns to the first tank 4. Since the adjusting valve 7 is closed, the returned mixture accumulates in the first tank 4. There it is constantly agitated by the agitator 11 to prevent the segregation of the mixtures. This operation continues until the level of the mixture in the second tank 5 reaches the lower limit.

At the fourth step, when the second sensor (level sensor) 9 detects that the level of the mixture in the second tank 5 has reached the lower limit, the adjusting valve 7 is opened, to supply the mixture that has accumulated in the first tank 4 to the second tank 5. The mixtures in the first and second tanks 4, 5 are constantly agitated by the agitators 11, 12 to prevent the segregation of the mixtures.

At the fifth step, when the first sensor (level sensor) 8 detects that the level of the mixture in the first tank 4 has reached the lower limit, the adjusting valve 7 is closed. Then the operation returns to the fourth step.

During the fourth and fifth steps, the mixture that has been processed by the device 3 for continuously dispersing is supplied at a constant rate to the first tank 4, which is connected to the outlet of the device 3 for continuously dispersing. The mixture (the raw material at the initial state) is supplied at a constant rate to the device 3 for continuously dispersing from the second tank 5, which is connected to the inlet of the device 3 for continuously dispersing.

While the fourth and fifth steps are repeated during the normal operation, the additives 15 to be dispersed are added by the feeder 17 to the mixture that is circulating. Thus a large amount of the mixture can be homogeneously dispersed. The amount of the additives 15 to be supplied, namely, Qa (kg/s), may be selected depending on the properties of the mixture.

In the method for the circulating-type dispersion by using the circulating-type dispersing system 1 the following equations (1)-(3) are used.

$$V1-V1'=V2+V_p$$

preferably $$V1-V1'>V2'+V_p$$

more preferably $$V1-V1'>>V2'+V_p \quad (1)$$

$$V2 \geq V1 \quad (2)$$

$$Q'>Q,$$

preferably $$Q>>Q \quad (3)$$

where V1: the maximum volume for the storage of the first tank 4 ($m^3$), V1': the minimum volume for the storage of the first tank 4 ($m^3$), V2: the maximum volume for the storage of the second tank 5 ($m^3$), V2': the minimum volume for the storage of the second tank 5 ($m^3$), $V_p$: the volume of the mixture in the piping that includes the device 3 for continuously dispersing, the pump 14, etc. ($m^3$), Q: the flow of the mixture in the piping 6 (kg/s), and Q': the flow of the mixture that passes through the adjusting valve 7 that is located between the first tank 4 and the second tank 5 (kg/s).

If the difference between (V1−V1') and (V2'+$V_p$) were small, the circulating-type dispersing system 1 would be almost the same as one where the outlet and the inlet of the device 3 for continuously deispering would just be connected by piping. Thus the system could not process a large amount of the mixture. Though a system with a small difference between (V1−V1') and (V2'+$V_p$) could be constructed, the advantageous effect, i.e., processing a large amount of the mixture, which is caused by providing the first tank 4 and the second tank 5, would decrease.

The volumes of V1' and V2' are preferably minimized in so far as they do not adversely affect the operation. If the volumes of V1' and V2' were large, the mixture would tend to accumulate in the first tank 4 and the second tank 5 without flowing out of them, to deteriorate the efficiency in uniformly dispersing the mixture.

When the mixture is supplied from the first tank 4 to the second tank 5 by opening the adjusting valve 7, controlling the agitator so that it can be stopped allows the mixture to be completely discharged from the first tank 4 (V1'=0). If agitating the mixture in the first tank 4 is not needed or if the operation of the agitator in the empty first tank 4 causes no trouble, the mixture in the first tank can be completely discharged from the tank 4. In these cases, since the mixture that remains in the first tank 4 lessens, the efficiency in uniformly dispersing the mixture increases. If V2', the minimum volume for storage of the second tank 5, is zero, a portion of the piping where no mixture is contained exists, to interrupt the flow of the mixture in the device 3 for continuously dispersing or the pump 14. That may cause a fluctuation in the workload or a problem of a vibration or a noise. Thus it is undesirable.

The additives 15 can be supplied at any place in the device for continuously dispersing, tanks, and piping. There may be a plurality of the places. Alternatively, in advance the liquid material as a medium and the additives may be mixed in the first tank 4.

As discussed above, the method for a circulating-type dispersion by using the circulating-type dispersing system 1 is a method for circulating and dispersing the slurry or liquid mixture where the mixture is dispersed by the device for continuously dispersing and circulated by the piping that connects in series the device for continuously dispersing, the first tank connected to the outlet of the device for continuously dispersing, and the second tank connected to the inlet of the device for continuously dispersing. The method has the following features. The mixture processed by the device 3 for continuously dispersing accumulates in the first tank 4 by closing the adjusting valve 7 that is disposed between the first tank 4 and the second tank 5. At the same time the mixture 2 in the second tank 5 is supplied to the device 3 for continuously dispersing. When the level of the mixture 2 in the second tank 5 reaches the lower limit, the adjusting valve 7 is opened, to supply the mixture 2 in the first tank 4 to the second tank 5. By these features a large amount of the mixture can be repeatedly dispersed, to thereby become homogeneous. The large amount of the mixture can be effectively dispersed. The time to obtain the entirely homogeneous mixture can be shortened.

The circulating-type dispersing system 1 of the present invention has the device 3 for continuously dispersing, the first and second tanks 4, 5, the piping 6, and the adjusting valve 7, which are discussed above. By closing the adjusting valve 7 the mixture 2 that has been processed by the device 3 for continuously dispersing accumulates in the first tank 4. At the same time the mixture 2 in the second tank 5 is supplied to the device 3 for continuously dispersing. When the level of the mixture 2 in the second tank 5 reaches the lower limit, the adjusting valve 7 is opened, to supply the mixture 2 in the first tank 4 to the second tank 5. Thus a large amount of the mixture can be repeatedly dispersed, to thereby become homogeneous. Thus a large amount of the mixture can be effectively dispersed. The time to obtain the entirely homogeneous mixture can be shortened.

In the method and system for the circulating-type dispersion, the adjusting valve 7 is controlled in the dispersing operation by means of the first sensor 8, the second sensor 9, and the controller 10, as discussed above. Thus an automated and very effective dispersing operation can be achieved, to obtain the unifomly processed mixture. By opening the adjusting valve 7 when the second sensor detects the level being at the lower limit and closing it when the first sensor detects the level being at the lower limit, a portion of the mixture that could remain in a tank and that is not subject to the dispersion, which has been a problem of conventional systems, which have only one storage tank, is eliminated. Thus an effective and uniform process can be achieved. The time for the process can be shortened.

Next, the device 3 for continuously dispersing, which is suitable for the above circulating-type dispersing system 1 and method, is discussed in detail with reference to FIGS. 4 to 7. The device 3 for continuously dispersing in FIG. 4 and so on is a device for continuously dispersing that effectively disperses a plurality of liquids or powdery substances in a slurry (a mixture of powdery substances and a liquid). The device 3 for continuously dispersing performs effective dispersion by incorporating both an ability to disperse within a small area by means of shearing forces and an ability to disperse within a large area.

Figure 4:
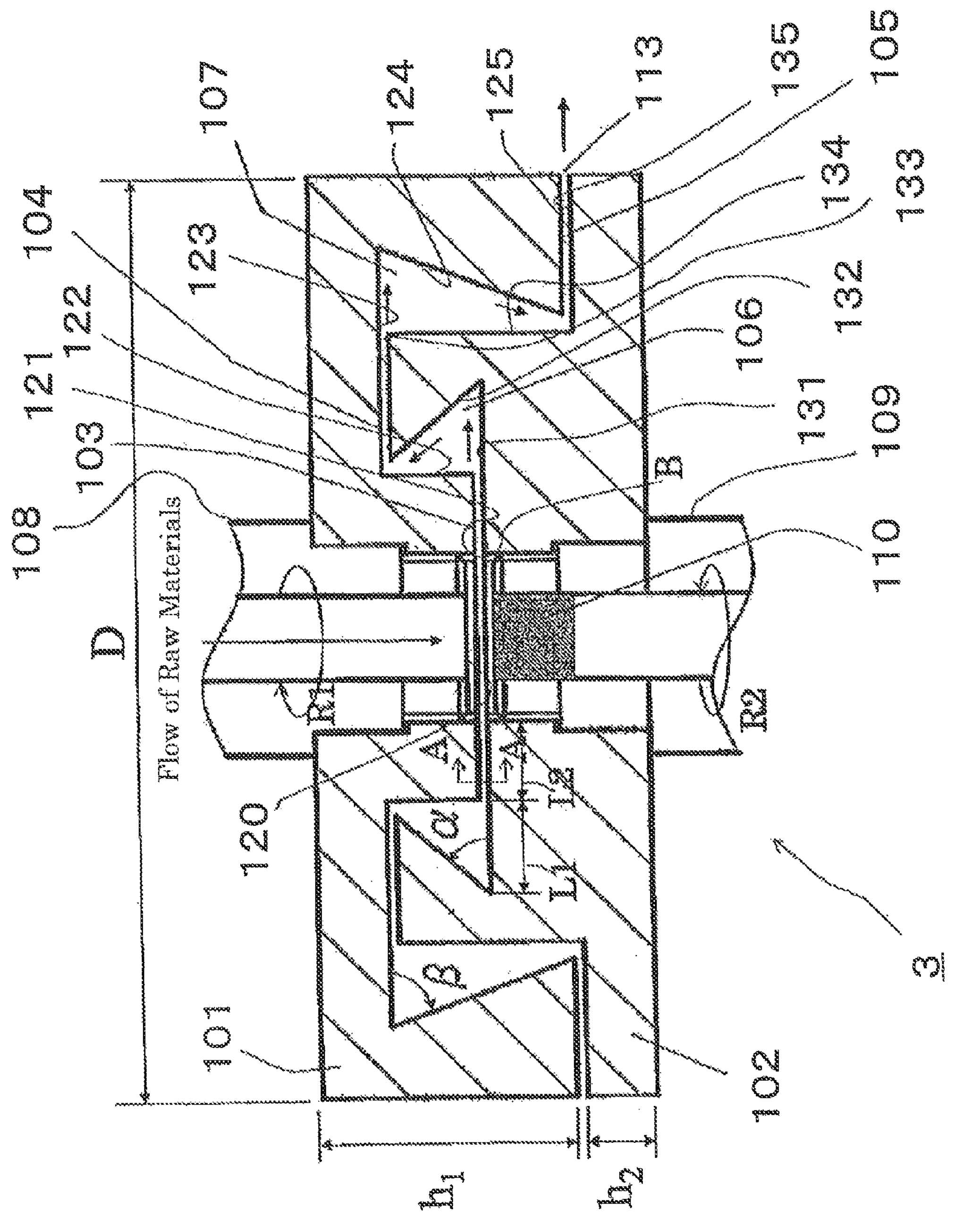
FIG. 4 illustrates an example of the device for continuously dispersing that constitutes the circulating-type dispersing system. It shows a schematic sectional drawing of two rotors that mate with each other.
Figure 5:
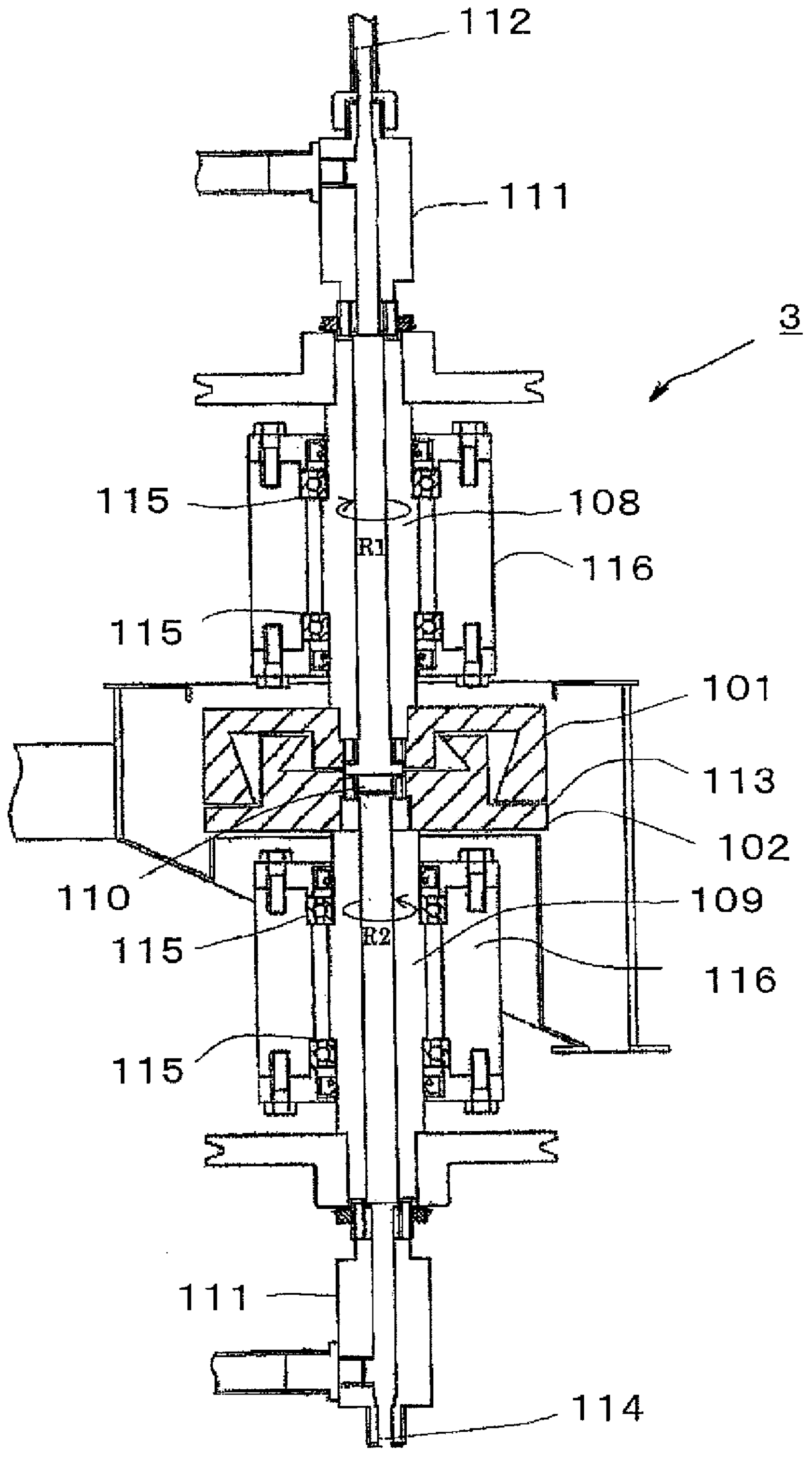
FIG. 5 is a schematic sectional diagram of the main portion of the device for continuously dispersing that constitutes the circulating-type dispersing system.
Figure 6:
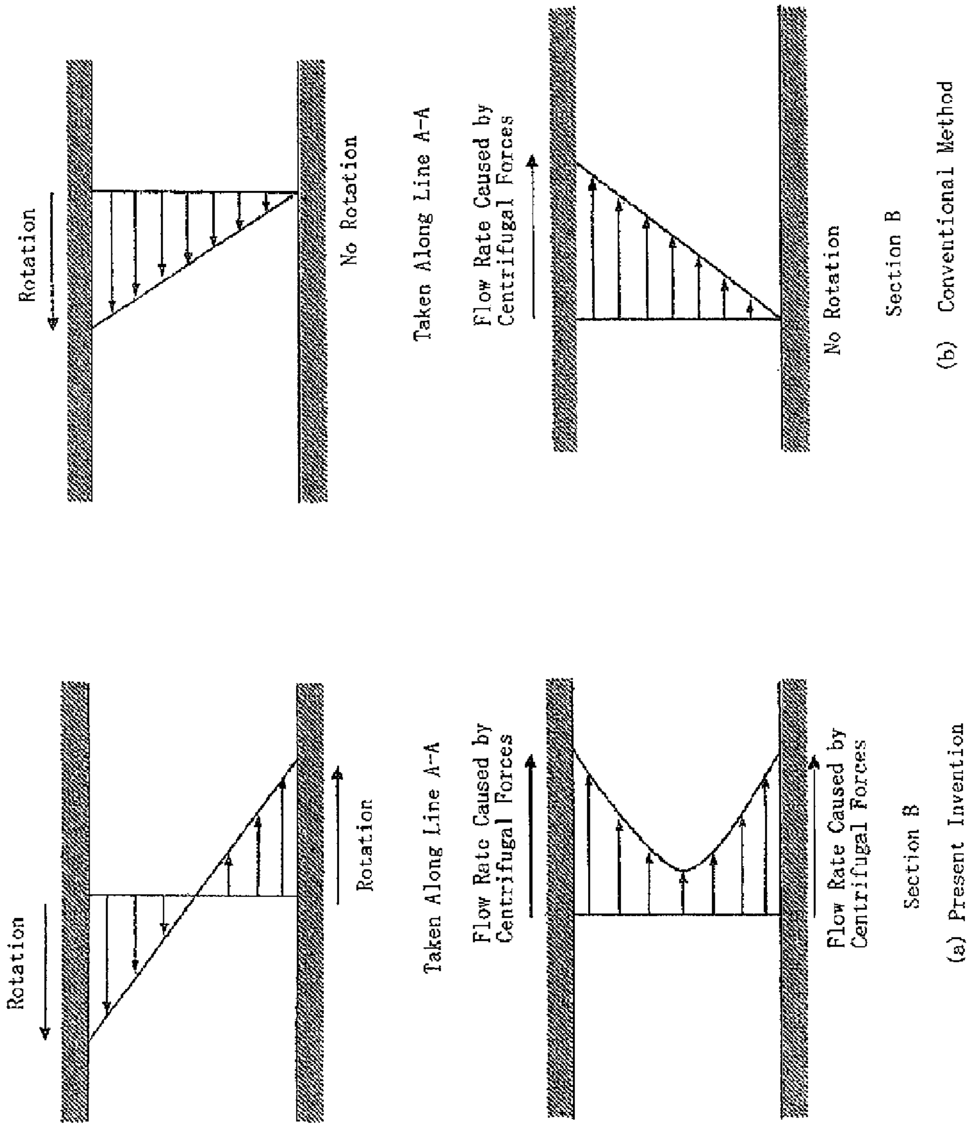
FIG. 6 is a schematic drawing that shows the distribution of flow rates at the device for continuously dispersing that constitutes the circulating-type dispersing system. It also shows the distribution of the flow rates of the device for a comparative example.

As shown in FIGS. 4 and 5, for example, the device 3 for continuously dispersing specifically comprises a first rotor 101 and a second rotor 102 that face each other. The mixture is dispersed while passing between the rotors 101, 102 to the outer circumferences of the rotors. It comprises a first means 108 for rotating the first rotor 101 in a first direction R1, and a second means 109 for rotating the second rotor 102 in the second direction R2, which is opposite the first direction R1. An outlet 120 for supplying the mixture is provided at the center of rotation of the first rotor 101 or the second rotor 102.

By configuring the device as discussed above, the first rotor 101 and the second rotor 102 rotate in opposite directions. Thus shearing energy is definitely imparted to all of the mixture. Thus the device 3 for continuously dispersing effectively disperses the mixture.

As shown in FIG. 4, for example, in the device 3 for continuously dispersing, a space 103 is formed on the outer side of the outlet 120, by the flat face 121 of the first rotor 101 and the flat face 131 of the rotor 102. A buffering section 106, in which the distance between the first and second rotors is greater than that in the space 103, is formed on the outer side of the space 103. A side 132 on the outer circumference is formed on the second rotor 102 on the outer side of the buffering section 106. The side 132 on the outer circumference causes the distance between the first rotor 101 and the second rotor 102 to be less than that in the buffering section 106.

By configuring the device 3 as discussed above, the space has a dispersing function within a small area caused by means of shearing forces and the buffering section has a dispersing function within a large area. Thus the device 3 for continuously dispersing effectively disperses the mixture.

As shown in FIG. 4, for example, in the device 3 for continuously dispersing, the side 132 on the outer circumference is disposed to be parallel to the axis 108 of rotation of, or inclined to the center of rotation of, the first rotor 101.

By configuring the device 3 as discussed above, since the side 132 on the outer circumference is disposed to be parallel to the axis of rotation of, or inclined to the center of rotation of, the first rotor 101, the mixture does not flow out of the buffering section 106, unless it has a volume that is more than that of the buffering section 106. Thus the mixture accumulates in that section. Since additional mixture from the space 103 flows toward the accumulated mixture in the buffering section 106 at a high speed and vigorously intermingles with it, the mixture is uniformly dispersed in the buffering section 106.

Figure 7:
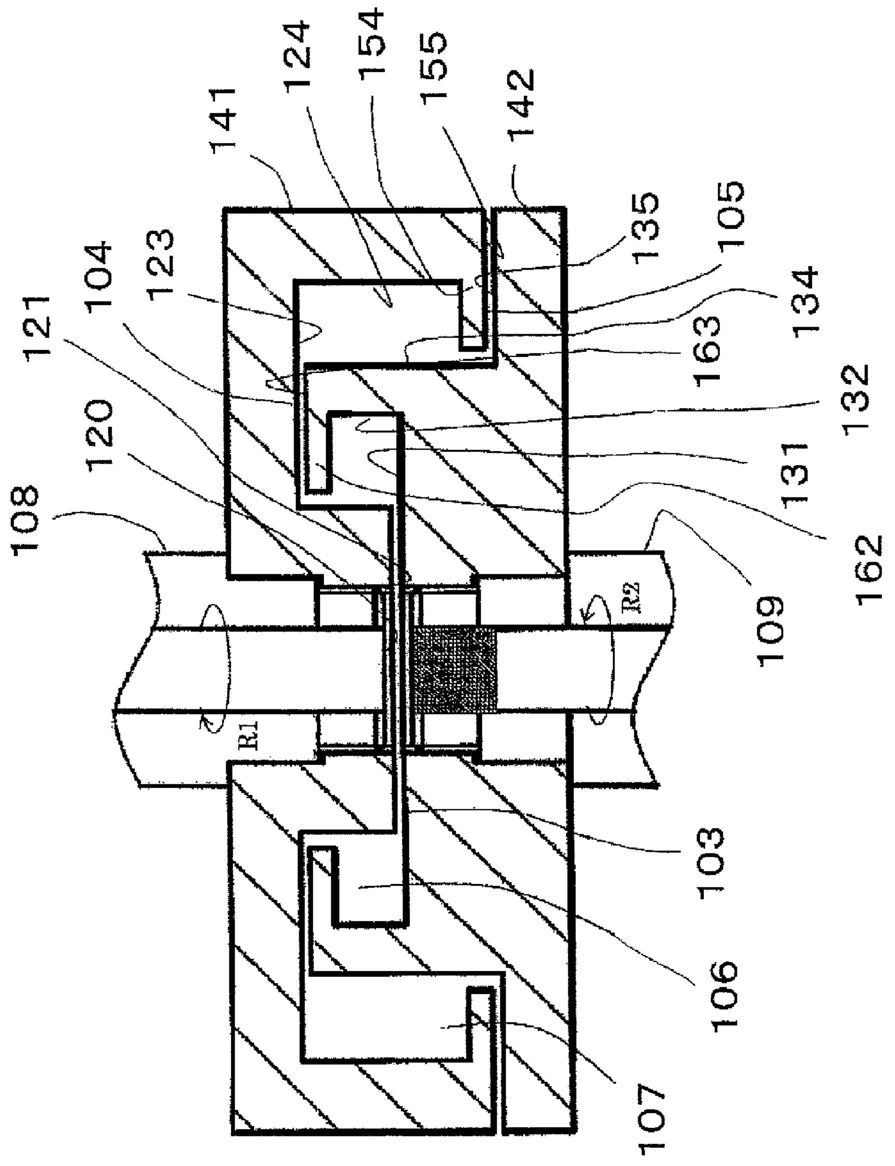
FIG. 7 illustrates a variation of the device for continuously dispersing that constitutes the circulating-type dispersing system, where the volume of the buffering section increases.

As shown in FIG. 7, for example, in the device 3 for continuously dispersing, the tip of the side 132 on the outer circumference is formed as an overhang 162 that extends toward the center of rotation.

By configuring the device as discussed above, since the tip of the side 132 on the outer circumference is formed as an overhang 162 that extends toward the center of rotation, the mixture does not flow out of the buffering section 106, unless it has a volume that is more than that of the buffering section 106. Thus the mixture accumulates in that section. Since additional mixture from the space 103 flows toward the accumulated mixture in the buffering section 106 at a high speed and vigorously intermingles with it, the mixture is uniformly dispersed in the buffering section.

As shown in FIG. 4, for example, in the device for continuously dispersing 3 the space 103 is located adjacent to the outlet 120 for supplying the mixture. By configuring the device 3 as discussed above, centrifugal forces caused by the rotation of the first and second rotors 101, 102 are applied to the mixture in the space 103. Thus, as the mixture flows outward, its flow rate increases. Further, a negative pressure is generated on the inner side of them. Thus the additional mixture is sucked through the outlet 120 for supplying the mixture into the space 103.

By configuring the device 3 as discussed above, centrifugal forces caused by the rotation of the first and second rotors 101, 102 are applied to the mixture in the space 103. Thus, as the mixture flows outward, its flow rate increases. Further, a negative pressure is generated on the inner side of them. Thus the additional mixture is sucked through the outlet 120 for supplying the mixture into the space 103.

As shown in FIG. 4, for example, in the device 3 for continuously dispersing, a second space 104 is formed, by the flat surface 123 of the first rotor 101 and the flat surface 133 of the second rotor 102, on the outer side of the buffering section 106. The distance between the first rotor 101 and second rotor 102 in the second space 104 is equal to or less than that in the space 103. A second buffering section 107 is formed on the outer side of the second space 104. The distance between the first and second rotors 1, 2 in the second buffering section 107 is greater than that in the second space 104. A second side 124 on the outer circumference is formed on the first rotor 101 on the outer side of the second buffering section 107. The second side 124 on the outer circumference causes the distance between the first and second rotors 101, 102 to be less than that in the second buffering section 107.

By configuring the device 3 as discussed above, in addition to the space and the buffering section, the second space 104 has a function to disperse the mixture in a small area by means of shearing forces. The second buffering section 107 has a function to disperse it within a large area. Thus the device for continuously dispersing effectively and repeatedly disperses the mixture.

As shown in FIG. 4, for example, in the device 3 for continuously dispersing, the buffering section 106 is formed by indenting the first rotor 101. The side 132 on the outer circumference is formed on the second rotor 102. The second buffering section 107 is formed by indenting the second rotor 102. The second side 124 on the outer circumference is formed on the first rotor 101.

By configuring the device 3 as discussed above, the space, the buffering section, the side on the outer circumference, the second space, the second buffering section, and the second side on the outer circumference, are all formed by indenting the first rotor 101 and the second rotor 102 so that they mesh. Thus this facilitates manufacturing a device for continuously dispersing that alternately and continuously carries out dispersion in a small area by means of shearing forces and then carries out mixing in a large area to cause the mixture to be homogenized.

Next, the device 3 for continuously dispersing will be discussed in detail with reference to FIGS. 4 to 7. In the device 3 two rotors that rotate at high speeds in opposite directions are arranged. Centrifugal forces cause the mixture to pass through the narrow space formed by the rotors. As shown in FIG. 4, two indented rotors 101, 102 are arranged on the same rotating axes to face each other in the vertical direction. By matching the respective concavities and convexities, narrow spaces 103, 104, 105 and wide spaces 106, 107 are alternately formed. As used herein, the narrow spaces 103, 104, 105, which cause strong shearing forces to be generated, are called sections for generating shearing forces. The wide spaces 106, 107, which cause the mixture to be mixed within the large areas, are called buffering sections. As shown in FIG. 5, the rotors 101, 102 are connected to rotating hollow shafts 108, 109, respectively. The rotating shafts 108, 109 are supported through bearings 115 by respective cases 116 for the bearings. The cases 116 are rigidly fixed (the method of fixing the cases is not shown in the drawings). The rotating shafts 108, 109 are driven by respective electric motors (not shown) through belts, chains, or gears to rotate in opposite directions R1, R2. Clockwise rotations are assumed as viewed from ports 112, 114 for supplying the mixture. The speeds of the rotation of the shafts are arbitrarily selected in accordance with the kinds of a mixture, the targeted degree of dispersion, etc. The mixture that is supplied to the ports 112, 114 for supplying the mixture passes through the hollow parts of the rotating hollow shafts to be delivered between the two rotors 101, 102 through the outlets 120 for supplying the mixture, which are disposed at the centers of rotations of the rotors 101, 102. In this embodiment, the outlet for supplying the mixture of the rotating hollow shaft 109 is closed by a plug 110 to prevent the mixture from flowing back in and then out again.

In the device 3 for continuously dispersing of FIG. 4, the outside diameter D of each of the rotors 101, 102 and 200 mm, and the heights h1, h2 are 55 mm and 15 mm, respectively. The gaps of the sections 103, 104, 105 for generating shearing forces are adjustable from 0.05 mm to 2 mm, but need not necessarily be the same. They are 103 for generating shearing forces, the section 104 for generating shearing forces, and the section 105 for generating shearing forces, in that order. By doing so, agglomerated particles in the mixture are sequentially dissolved into finer particles to be uniformly dispersed. The angles α, β of the sides 132, 124 on the outer circumferences of the buffering sections 106, 107 are 50 degrees and 70 degrees, respectively. However, they are not limited to such values. In accordance with the shapes and sizes of the rotors 101, 102, they are arbitrarily selected to be acute angles or right angles, i.e., being inclined to the directions toward the centers of rotations (the directions toward the rotating hollow shafts 108, 109), or parallel to the rotating hollow shafts 108, 109. In the device for continuously dispersing, the speeds of rotation are adjusted from 0 to 1,720 rpm by means of an inverter control. They are arbitrarily modified by selecting electric motors, pulleys, ears. etc.

By referring to FIG. 4, the structures of the sections 103, 104, 105 for generating shearing forces and the buffering sections 106, 107 are now described. The surface of the upper rotor 101 that faces the lower rotor 102 is formed on the outer side of the outlet 120 as a flat surface 121 that is perpendicular to the axis of rotation. On the outer side of the flat surface 121 an indentation is formed by a side 122 on the inner circumference, a flat surface 123, and a side 124 on the outer circumference. The flat surface 123 is parallel to the flat surface 121. The side 124 on the outer circumference extends over the flat surface 121 and toward the side of the lower rotor 102. At the tip of it a flat surface 125, which is also parallel to the flat surface 121, is formed. On the surface of the lower rotor 102 that faces the upper rotor 101, a flat surface 131, which is parallel to and faces the flat surface 121, is formed. The flat surface 131 extends over the side 122 on the inner circumference and toward the outer circumference. A side 132 on the outer circumference is formed from the flat surface 131 toward the upper rotor 101. A flat surface 133, which is parallel to the flat surface 123, is formed from the tip of the side 132 on the outer circumference. The flat surface 133 forms an indentation with the side 134 on the inner circumference and the flat surface 135, which is parallel to and faces the flat surface 125. The side 134 is located on the inner side of the side 124.

By so arranging the upper rotor 101, which has the surfaces as discussed above, and the lower rotor 102, the section 103 for generating shearing forces is formed by the flat surface 121 and the flat surface 131. The section 104 for generating shearing forces is formed by the flat surface 123 and the flat surface 133. The section 105 for generating shearing forces is formed by the flat surface 125 and the flat surface 135. The buffering section 106 is formed as a region surrounded by the side 122, the flat surface 123, the side 132, and the flat surface 131. The buffering section 107 is formed as a region surrounded by the side 134, the flat surface 123, the side 124, and the flat surface 135. The side 124 extends over the flat surface 121 and toward the lower rotor 102 to form the buffering section 107. Thus the volume of the buffering section 107 becomes larger, to thereby cause the mixture to be homogenized by dispersion in a large area.

Though in the embodiment discussed above, the side 124 on the outer circumference extends over the flat surface 121 and toward the lower rotor 102, the side 124 may extend to be at the same level as that of the flat surface 121. That is, the flat surface 121 and the flat surface 125 may be disposed on the same plane. In such a structure, three sections 103, 104, 105 for generating shearing forces and two buffering sections 106, 107 can be formed by forming one indentation on the upper rotor 101 and forming one projection on the lower rotor 102 (the portion surrounded by the side 132, the flat surface 133, and the side 134). Thus this facilitates manufacturing a device for continuously dispersing that alternately and continuously carries out dispersion in a small area by means of shearing forces and then carries out mixing in a large area to cause the materials to be homogenized. Further, the side 124 need not extend beyond the flat surface 121.

Though the flat surfaces 121, 123, 125, 131, 133, 135 are described to be perpendicular to the axes of rotations and be parallel to each other, it is not necessary that they be so arranged. Further, the flat surfaces for forming the sections 103, 104, 105 for generating shearing forces are not necessarily parallel to each other. By making the gaps of the sections 103, 104, 105 become narrower toward the outer circumference, agglomerated particles in the raw materials are sequentially dissolved into finer particles.

The buffering sections 106, 107 are the regions for accumulating liquids. Those regions have large volumes in order to mix the mixture that has been subjected to dispersion in a small area at the sections 103, 104. For this purpose the radius L1 of the flat surface 131, which forms the buffering section 106, is, for example, at least half of the radius L2, but is normally equal to or more than the radius L2, of the flat surface that faces the flat surface 121 to form the section 103 for generating shearing forces. The height of the buffering section 106 (the sum of the gap of the space at the section 103 plus the height of the side 122) is at least three times, but is normally five or more times, the height of the gap of the space of the section 103.

In FIG. 4, the flow of the mixture is indicated by an arrow. Though for simplicity only one arrow is drawn, similar flows are generated all over the regions that are formed by the rotors 101, 102. In addition FIG. 5 is again referred to. While the rotors 101, 102 rotate, the mixture is supplied through the port 112 for supplying it on a joint 111 that twists, which is connected to the rotating hollow shaft 108 and equipped with a stopper to stop the rotation (not shown). The mixture is supplied through the outlet 120 for supplying it into a space between the rotors 101, 102. It flows in the direction of the centrifugal forces through the section 103 for generating shearing forces, through the buffering section 106, through the section 104 for generating shearing forces, through the buffering section 107, and through the section 105 for generating shearing forces, all of which are formed by the rotor 101 and the rotor 102. It is discharged from a section 113 for discharging the mixture. It is located on the outer circumference of the rotors. Since the mixture flows by means of the centrifugal forces in the direction toward the outer circumference, the flow rate increases. The pressure at the outlet 120 for supplying the mixture becomes negative. Thus the flow of the mixture from the outlet 120 increases.

The plug 110 may be removed from the outlet of the rotating hollow shaft 109 to supply other mixture from the port 114 for supplying mixture. Thus the mixture from the port 114 and that from the port 112 can be mixed. However, in this case the central axes of the rotors and shafts must be horizontal, or a pump for the mixture must be installed, because normally the negative pressure at the outlet 120 is not so great that it can draw the mixture as high along the entire length of the rotating hollow shaft 109.

In the device for continuously dispersing, two rotating shafts are described as being driven by separate electric motors. However, they may be driven by just one electric motor if the driving force is separated by gears, etc. These electric motors, belts, chains, gears, etc., constitute a means for rotating the rotating hollow shafts 108, 109.

With reference to FIG. 4, the process (a method) for dispersing the mixture that uses the device 3 for continuously dispersing is described. First, the mixture is subjected to strong shearing forces when passing through the first section 103 for generating shearing forces. Thus, emulsifying or dissolving agglomerated particles is carried out. If the two rotors 101, 102 rotate at the same speed, then the distributions of the speeds of the mixture taken along line A-A and at section B are to be those as in FIG. 6(*a*). No part at which the speed is zero exists. In contrast, in the conventional system, where one of the rotors 101, 102 is stationary, and if the stationary rotor is assumed to be the lower rotor 102, then the distributions of the speeds are to be those as in FIG. 6(*b*). The speeds on the surface of the lower rotor 102 are zero in the direction of the rotation and the radial direction, which is the same direction as that of the centrifugal forces. Thus the mixture near the surface of the lower rotor 102 are poorly dispersed. In the device 3 of the present invention, even at the central position between the two rotors 101, 102, where the speed in the direction of the rotation is zero, the speed in the radial direction is not zero, because of the movement caused by the centrifugal forces. That is, the movements caused by the centrifugal forces on both sides adjacent to the central position are in the same outward direction. Thus the mixture at the central position is drawn outwardly by shearing forces (viscous behaviors) caused by those movements. Since no part at which the speed is zero exists, shearing forces are definitely imparted to all of the mixture. Thus effective dispersion is obtained. In detail, the shearing force at the central position between the two rotors is weak, as shown in the figure taken along the line A-A in FIG. 6(*a*). However, unlike the stationary rotor, of which the speed is zero, the fluctuation of the speed is great, due to the rotation at the high speed. Thus the shearing force does not affect the effective dispersion. The mixture is imparted strong shearing forces at the section for generating shearing forces so that emulsifying, or dissolving agglomerated particles, or dispersing particles, is carried out in a small area. After being discharged from the section 103 it flows into the first buffering section 106. In the buffering section 106, the side 132 on the outer circumference is formed to make the distance between the rotors 101, 102 smaller. Thus the mixture that flows into the buffering section 106 accumulates there without flowing out, unless the volume of the mixture exceeds that of the buffering section 106. The mixture in the buffering section 106 is pressed against the side 132 by the centrifugal forces. As shown in FIG. 4, the side 132 of the buffering section 106 is inclined so as to resist the flow of the mixture. Thus the mixture must flow into the buffering section 106 at an amount that exceeds the volume of the section 106, to thereby cause the mixture to flow out of the section 106. The mixture that has flowed into the buffering section 106 and accumulated there vigorously intermingles with the mixture that later flows at a high speed into the buffering section 106 from the section 103 for generating shearing forces. Thus the mixture that has been emulsified or dispersed in a small area is homogenized by intermingling in a large area. Then the mixture flows through the second section 104 for generating shearing forces and the second buffering section 107 to be subjected to dispersion similar to that in the first section 103 for generating shearing forces and the first buffering section 106. It flows through the last section, namely, the third section 105, for generating shearing forces to be subjected to further dispersion.

To uniformly mix the mixture by the device for continuously dispersing, the particles in the mixture that is to be supplied to the device are preferably dissolved to be emulsions or agglomerated particles that are smaller than the minimum gap at the sections for generating shearing forces. Further, the mixture is uniformly mixed in a unit that has a volume that at least equals that of the smallest section for generating shearing forces (the volume=the area of the section for shearing forces x the gap). This process is carried out by a preliminary mixing as a prior process. If they are not dissolved to be emulsions or agglomerated particles that pass through the gap at the section 103 for generating shearing forces, liquid drops or agglomerated particles that are larger than the gap could hardly flow into the space of the section 103 when the mixture flows there. Thus this could cause the mixture to be unevenly dispersed or the flow path to be clogged. That may also cause the device to be damaged by undue shearing forces. Being uniformly mixed in a unit that has a volume that equals that of the smallest section for generating shearing forces means that, when a part of the preliminarily-mixed mixture that has the same volume as that of the smallest section for generating shearing forces is taken out from the mixture, the contents of a plurality of mixtures in each part are constant. This does not relate to any conditions for emulsifying or dissolving agglomerated particles. For example, in FIG. 4, the smallest section for generating shearing forces is the space within the section 103. When the gap is 0.1 mm, the volume is about 0.3 ml. However, if the device for continuously dispersing of the present invention is used for a preliminary mixing, some of the above requirements are not necessarily complied with.

The configurations of the buffering sections 106, 107 are not limited to the inclined ones that are shown as the sides 132, 124 on the outer circumferences in FIG. 4. As shown in FIG. 7, the overhangs 162, 154 that extend toward the center of rotation (to the rotating hollow shafts 108, 109) may be formed at the tips of the sides 106, 107 on the outer circumferences, to increase the volumes of the buffering sections 106, 107. Since the flat surface 163 of the overhang 162, which faces the flat surface 123 of the upper rotor 141, is a part of the section 104 for generating shearing forces, the section 104 is enlarged in the radial direction. Thus greater dispersion in a small area is carried out. Similarly, the flat surface 155, which faces the flat surface 135 of the lower rotor 142, causes the section 105 for generating shearing forces to be enlarged. Thus greater dispersion in a small area is carried out.

The number of sections for generating shearing forces and that of buffering sections are specified to be three and two, respectively. However, the numbers are not limited to these, and may be adjusted in accordance with the mixture to be processed and the targeted degree of dispersion.

The device 3 for continuously dispersing that is discussed above effectively disperses the mixture by effectively imparting shearing energy to all the mixture. The device comprises a first rotor and a second rotor that face each other. The mixture is dispersed while passing between the two rotors to the outer circumferences of the rotors. It comprises a first means for rotating the first rotor in a first direction, and a second means for rotating the second rotor in the second direction, which is opposite the first direction. An outlet for supplying the mixture is provided at the center of rotation of the first rotor.

A space is formed by the flat surface of the first rotor and the flat surface of the second rotor on the outer side of the outlet for supplying the mixture. A buffering section, in which the distance between the first and second rotors is greater than that in the space, is formed on the outer side of the space. A side on the outer circumference is formed on the first rotor or the second rotor or both on the outer side of the buffering section. The side on the outer circumference causes the distance between the first and second rotors to be less than that in the buffering section. Thus the function to mix the mixture in a large area to cause the mixture to be homogenized is generated after the function to disperse it in a small area by means of shearing forces is generated. These functions are combined to effectively disperse the mixture.

As discussed above, the device 3 for continuously dispersing that is described with reference to FIGS. 4 to 7 is appropriately used for the circulating-type dispersing system 1, which is discussed above. The device 3 for continuously dispersing by itself effectively disperses the mixture. Further, it is adapted to function with the circulating-type dispersing system 1 since the mixture that has flowed into the device 3 for continuously dispersing is dispersed and sequentially flows out of the device 3. In other words, the dispersing system 1, which includes the device 3 for continuously dispersing, can repeatedly and uniformly disperse a large amount of the mixture because of the following reasons. The device 3 for continuously dispersing has portions where the mixture is stored or accumulates. If the mixture that is being dispersed were to accumulate there, it would adversely affect the uniform dispersion of the mixture. However, the device 3 for continuously dispersing comprises the sections 103, 104 for generating shearing forces where a dispersion in a small area is carried out, and the buffering sections 106, 107, where the mixture that has been dispersed in a small area at the sections 103, 104 accumulates to be mixed. That is, there is no portion where the mixture stays for an unnecessarily long time. Thus a large amount of the mixture can be effectively dispersed. The time to obtain an entirely homogeneous mixture can be shortened.

The invention claimed is:

1. A circulating-type dispersing system for circulating and dispersing a slurry or liquid mixture, comprising:

a device for dispersing the mixture;

a first tank connected to an outlet of the device;

a second tank connected to an inlet of the device;

piping that connects the device, the first tank, and the second tank in series, and formed as a circle;

an adjusting valve provided on the piping between the first tank and the second tank for adjusting levels of the mixture in the first tank and the second tank;

wherein by closing the adjusting valve the mixture that has been processed by the device accumulates in the first tank and the mixture in the second tank is supplied to the device, wherein, when the level of the mixture in the second tank reaches a lower limit, the adjusting valve is opened to supply the mixture in the first tank to the second tank, wherein the first tank is equipped with a first sensor for detecting if the level of the mixture in the first tank reaches a lower limit and the second tank is equipped with a second sensor for detecting if the level of the mixture in the second tank reaches the lower limit, and wherein the circulating-type dispersing system further comprises:

a controller for controlling the adjusting valve based on the levels detected by the first and second sensors, and wherein the controller causes the adjusting valve to open when the second sensor detects that the level of the mixture in the second tank has reached the lower limit and the controller causes the adjusting valve to close when the first sensor detects that the level of the mixture in the first tank has reached the lower limit.

2. The circulating-type dispersing system of claim 1, wherein a size of the piping that connects an outlet of the first tank and an inlet of the second tank is greater than a size of the piping that connects an outlet of the second tank and the inlet of the device.

3. The circulating-type dispersing system of claim 2, wherein a pump is provided on the piping between the first tank and the second tank.

4. A circulating-type dispersing method for circulating and dispersing a slurry or liquid mixture, comprising:

dispersing the mixture by a device for continuously dispersing and circulating the mixture through piping that connects the device for continuously dispersing, a first tank connected to an outlet of the device for continuously dispersing, and a second tank connected to an inlet of the device for continuously dispersing;

wherein by stopping a flow of the mixture from the first tank to the second tank the mixture that has been processed by the device for continuously dispersing accumulates in the first tank and the mixture in the second tank is supplied to the device for continuously dispersing, and wherein, when a level of the mixture in the second tank reaches a lower limit, the mixture in the first tank is supplied to the second tanks;

the method further comprising detecting if a level of the mixture in the first tank reaches a lower limit; detecting if the level of the mixture in the second tank reaches the lower limit, and dispersing and circulating the mixture while adjusting the flow of the mixture from the first tank to the second tank;

wherein, when the level of the mixture in the second tank reaches the lower limit the mixture in the first tank is allowed to flow to the second tank, and wherein, when the level of the mixture in the first tank reaches the lower limit the flow of the mixture from the first tank to the second tank is stopped.

5. The circulating-type dispersing method of claim 4, wherein, when the mixture in the first tank is supplied to the second tank, the flow of the mixture from the first tank to the second tank is greater than the flow of the mixture from the second tank to the device for continuously dispersing.

6. The circulating-type dispersing method of claim 5, wherein the mixture flows from the first tank to the second tank by means of a pump.

* * * * *

UNITED STATES PATENT AND TRADEMARK OFFICE

CERTIFICATE OF CORRECTION

PATENT NO. : 9,101,891 B2
APPLICATION NO. : 13/638720
DATED : August 11, 2015
INVENTOR(S) : Katsuaki Odagi It is certified that error appears in the above-identified patent and that said Letters Patent is hereby corrected as shown below:

In the claims,

Claim 4, col. 16, line 13, “supplied to the second tanks;” should read -- supplied to the second tank; --.

Signed and Sealed this
Fifteenth Day of March, 2016

Michelle K. Lee
*Director of the United States Patent and Trademark Office*